United States Patent
Eliaz

(10) Patent No.: US 8,548,097 B1
(45) Date of Patent: Oct. 1, 2013

(54) COARSE PHASE ESTIMATION FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,028

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H03H 7/30* (2006.01)

(52) U.S. Cl.
USPC ........... 375/323; 375/232; 375/230; 375/229; 708/319; 708/320; 708/322; 708/323

(58) Field of Classification Search
USPC ................. 375/232, 230, 229; 708/319, 320, 708/322, 323
See application file for complete search history.

(56) References Cited

PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

(Continued)

*Primary Examiner* — Zewdu Kassa

(74) *Attorney, Agent, or Firm* — McAndrews, Held & Malloy, Ltd.

(57) ABSTRACT

Methods and systems are provided for coarse phase estimation for highly-spectrally efficient communications. An example method may include, equalizing, in a receiver, a received inter-symbol correlated (ISC) signal to generate an equalized ISC signal. A phase adjustment signal may be generated based on an ISC feedback signal. The ISC feedback signal may be generated using a sequence estimation process and a non-linearity function. A phase of the equalized ISC signal may be adjusted using the generated phase adjustment signal, to generate a phase adjusted partial response signal. The phase adjustment signal may be generated based on a phase difference between the equalized ISC signal and the partial response feedback signal. At least one ISC vector may be generated by buffering samples of the phase adjusted ISC signal.

17 Claims, 6 Drawing Sheets

(56) References Cited

PUBLICATIONS

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

US 8,548,097 B1

COARSE PHASE ESTIMATION FOR HIGHLY-SPECTRALLY-EFFICIENT COMMUNICATIONS

CLAIM OF PRIORITY

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

Each of the above stated applications is hereby incorporated herein by reference in its entirety.

INCORPORATION BY REFERENCE

This patent application also makes reference to:

U.S. patent application Ser. No.: 13/754,964, titled "Low-Complexity, Highly-Spectrally-Efficient Communications," and filed on the same date as this application;

U.S. patent application Ser. No.: 13/754,998, titled "Design and Optimization of Partial Response Pulse Shape Filter," and filed on the same date as this application;

U.S. patent application Ser. No.: 13/755,001, titled "Constellation Map Optimization For Highly Spectrally Efficient Communications," and filed on the same date as this application;

U.S. patent application Ser. No.: 13/755,008, titled "Dynamic Filter Adjustment for Highly-Spectrally-Efficient Communications," and filed on the same date as this application;

U.S. patent application Ser. No.: 13/755,011, titled "Timing Synchronization for Reception of Highly-Spectrally-Efficient Communications," and filed on the same date as this application;

U.S. patent application Ser. No.: 13/755,018, titled "Feed Forward Equalization for Highly-Spectrally-Efficient Communications," and filed on the same date as this application;

U.S. patent application Ser. No.: 13/755,021, titled "Decision Feedback Equalizer for Highly-Spectrally-Efficient Communications," and filed on the same date as this application;

U.S. patent application Ser. No.: 13/755,025, titled "Decision Feedback Equalizer with Multiple Cores for Highly-Spectrally-Efficient Communications," and filed on the same date as this application;

U.S. patent application Ser. No.: 13/755,026, titled "Decision Feedback Equalizer Utilizing Symbol Error Rate Biased Adaptation Function for Highly-Spectrally-Efficient Communications," and filed on the same date as this application;

U.S. patent application Ser. No.: 13/755,039, titled "Fine Phase Estimation for Highly Spectrally Efficient Communications," and filed on the same date as this application; and U.S. patent application Ser. No.: 13/755,043, titled "Joint Sequence Estimation of Symbol and Phase with High Tolerance of Nonlinearity," and filed on the same date as this application.

Each of the above stated applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for coarse phase estimation for highly-spectrally-efficient communications, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z"

means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

As referenced herein, if one or more parameters may be set "dynamically", it means that, in an example implementation, the parameters may be configured during run-time of a transmitter and/or receiver (e.g., in, or near, real-time) based, for example, on recently received signals and/or signals currently being received.

Figure 1:
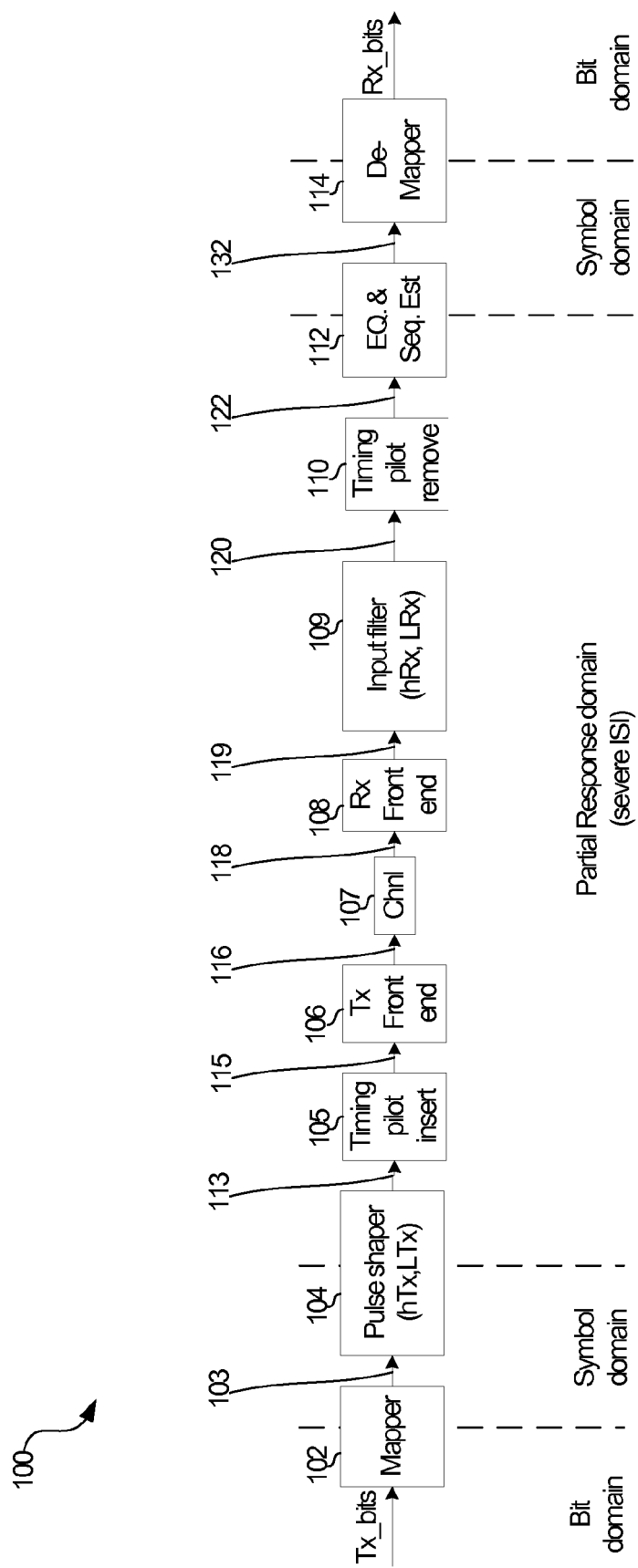
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $\text{Log}_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
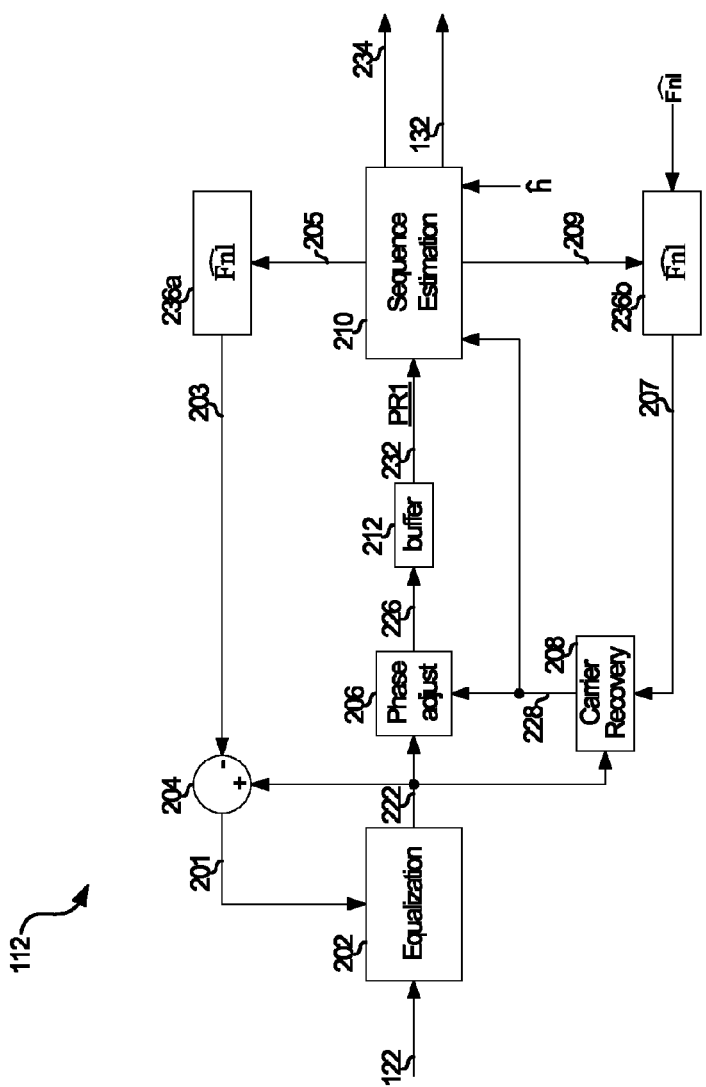
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 is described in greater detail herein below in reference to FIGS. 4-6.

The phase adjust circuit 206 may be operable to adjust the phase of the signal 222 to generate the signal 226. The amount and direction of the phase adjustment may be determined by the phase adjustment signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response $\hat{h}$. Response $\hat{h}$ is based on h (the total partial response, discussed above). For example, response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, response $\hat{h}$ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
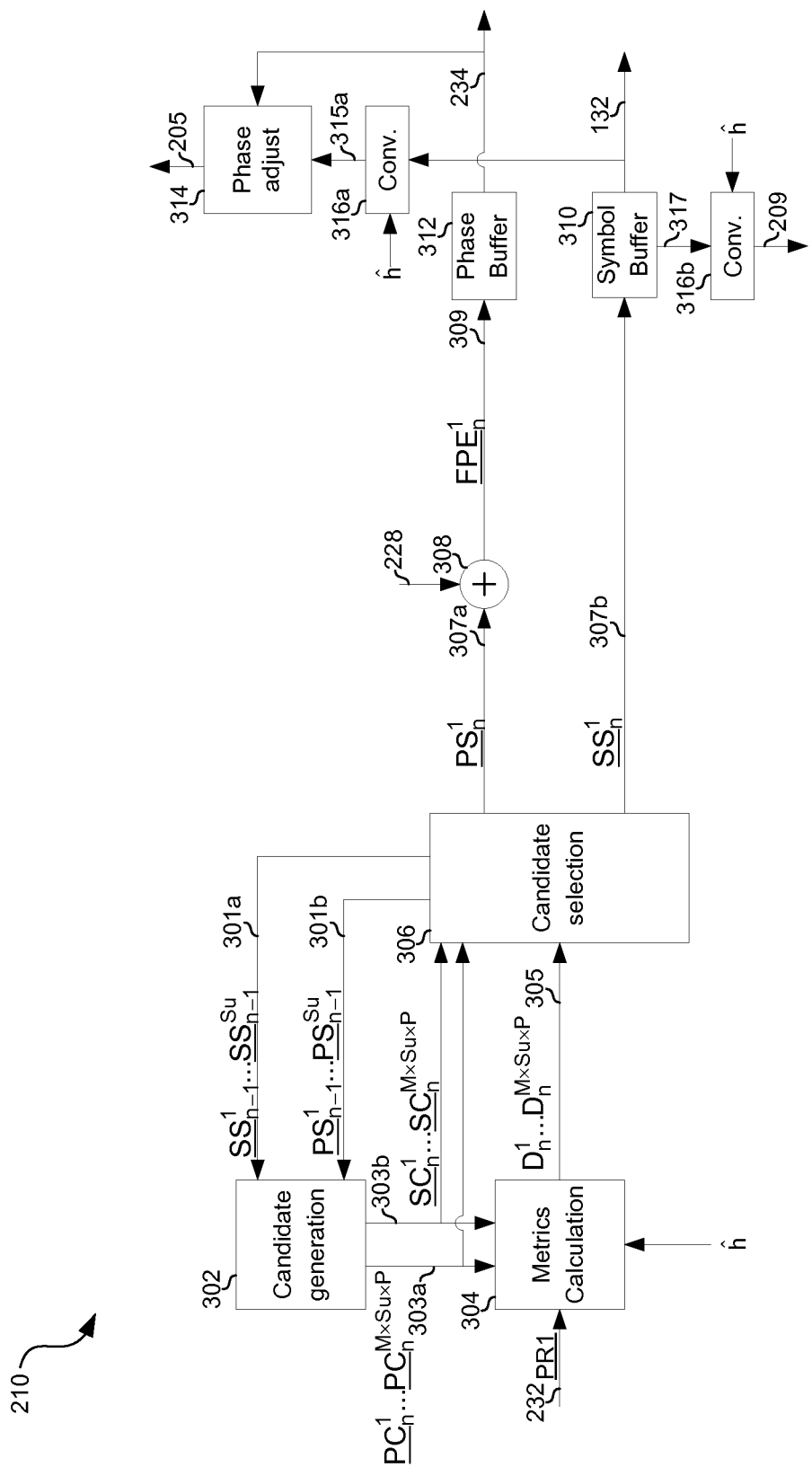
FIG. 3 is a block diagram depicting an example sequence estimation circuit for use in a system configured for low-complexity, highly-spectrally-efficient communications.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su > P}$ based on the partial response signal PR1, the signal 303a conveying the phase candidate vectors $PC_n^1 \ldots PC_n^{M \times Su \times P}$ and the signal 303b conveying the symbol candidate vectors $SC_n^1 \ldots SC^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols.

The candidate selection circuit 306 may be operable to select Su of the symbol candidates $SC_n^1 \ldots SC^{M \times Su \times P}$ of the phase candidates $PC_n^1 \ldots PC^{M \times Su \times P}$ based on the metrics $D_n^1 \ldots D^{M \times Su \times P}$. The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{Su}$ may comprise a soft-decision estimate and/or a hard-decision estimate of a symbol of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case.

The candidate generation circuit 302 may be operable to generate phase candidates $PC_n^1 \ldots PC^{M \times Su \times P}$ and symbol candidates $SC_n^1 \ldots SC^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described in the United States patent application titled "Joint Sequence Estimation of Symbol and Phase with High Tolerance of Nonlinearity," which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors.

The combiner circuit 308 may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_m^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response ĥ, resulting in the partial response signal 315a. Similarly, the convolution circuit 316b may be operable to convolve the signal 317 with response ĥ, resulting in the convolved partial response signal 209. As noted above, response ĥ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response ĥ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
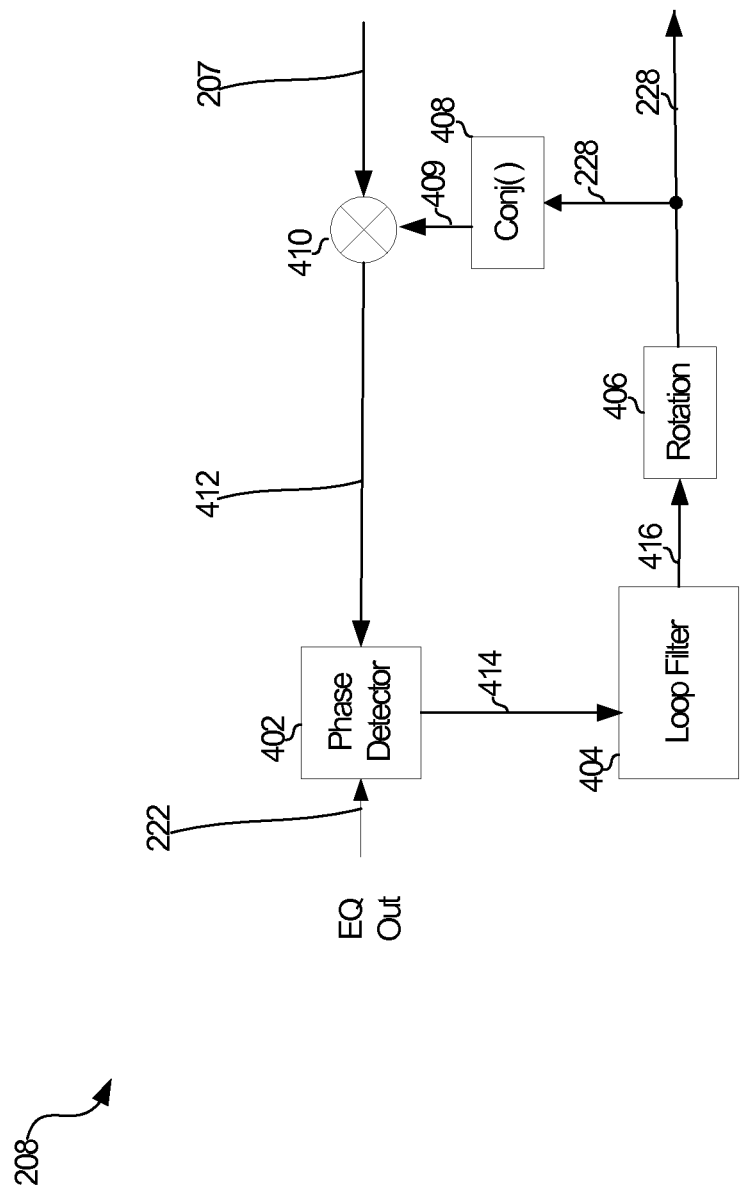
FIG. 4 is a block diagram illustrating an example carrier recovery circuit for use in a system configured for low-complexity, highly-spectrally-efficient communications.

FIG. 4 is a block diagram illustrating an example carrier recovery circuit for use in a system configured for low-complexity, highly-spectrally-efficient communications. Referring to FIG. 4, there is illustrated a more detailed diagram of the carrier recovery circuit 208, which may comprise a phase detector circuit 402, a loop filter 404, a rotating function module 406, a conjugate function module 408 and a multiplier 410.

The phase detector circuit 402 may comprise suitable circuitry, logic and/or code and may be operable to generate a phase error signal (e.g., signal 414) based on a phase difference between at least two signals (e.g., the equalized partial response signal 222 and a rotated version (e.g., 412) of the partial response feedback signal (e.g., 207)).

The loop filter 404 may comprise suitable circuitry, logic and/or code and may be operable to filter the phase error signal (e.g., 414) to generate a filtered phase adjustment signal (e.g., 416). In an example implementation, the loop filter 404 may comprise a $2^{nd}$-order loop, which may be operable to track frequency errors with zero steady state error. A bandwidth of the loop may be determined by the depth (e.g., configured via a parameter Q) of the symbol buffer 310 (e.g., configured via parameter Q), and/or an index of the symbol buffer 310 from which the signal 317 is output (e.g., configured via a parameter q1).

In an example embodiment, the loop filter 404 may comprise a proportional-integral-derivative (PID) controller and one or more of the integral gain (Ki), derivative gain (Kd), and proportional gain (Kp), may be set dynamically according to, for example, SNR, phase noise levels, metric values calculated by the sequence estimation circuit 112 (e.g., individual values or the slope of values calculated over time) and/or any other suitable indicator of performance and/or channel conditions. Similarly, other parameters affecting loop bandwidth (e.g., Q and q3 described in the United States patent application titled "Low-Complexity, Highly-Spectrally-Efficient Communications," which is incorporated herein by reference, as set forth above, may be dynamically configured during run-time. In an example implementation, dynamic adjustment of one or more parameters may be enabled and disabled based on any suitable indicator of performance and/or channel conditions such as, for example, SNR, phase noise levels, metric values calculated by the sequence estimation circuit 112 (e.g., individual values or the slope of values calculated over time), and/or the strength or variance of signal 414. For example, dynamic adjustment of Kp and/or Kd may be disabled (and Kp and Kd may be forced to zero), during error bursts when symbol errors are detected in the receiver, or in case that quality indicators for the estimated symbols are implying low reliability of certain symbols. Dynamic adjustment of Kp and/or Kd may resume (and Kp and Kd may return to normal values), upon the symbol error bursts termination, or if quality indicators for the estimated symbols are implying for good detected symbols reliability.

The rotating function module 406 may comprise suitable circuitry, logic and/or code and may be operable to apply a rotating function to the filtered phase adjustment signal 416 to generate the phase adjustment signal 228. The rotating function (e.g., 406) may comprise, for example, an exponential function, such as exp(j*x)=cos(x)+j*sin(x). In this regard, the rotating function block 406 may be operable to generates a complex waveform (exp(j*x)=cos(x)+j sin(x)), and may rotate that waveform by a phase output value (e.g., 416), resulting in a complex waveform (e.g., signal 228) having the phase shift corresponding to the phase output value.

The conjugate function module 408 may comprise suitable circuitry, logic and/or code and may be operable to output the complex conjugate of phase adjustment signal 228 as conjugate output signal 409. More specifically, the conjugate function module 408 may be operable to output, as signal 409, the real part of the complex waveform of signal 228 plus the negative of the imaginary part of signal 228.

The multiplier 410 may comprise suitable circuitry, logic and/or code and may be operable to generate the rotated version 412 of the partial response feedback signal 207 by multiplying the conjugate output signal 409 with the partial response feedback signal 207.

In operation, the phase detector 402 may generate the phase error signal 414 based on a phase difference between the equalized partial response signal 222 and the rotated version (e.g., signal 412) of the partial response feedback signal 207. The phase error signal 414 may be filtered by the loop filter 404 to generate the filtered phase adjustment signal 416, which may then be processed by the rotating function module 406 to generate the phase adjustment signal 228. The phase adjustment signal 228 may be communicated to the conjugate function module 408 for purposes of generating the rotated version (412) of the partial response feedback signal 207, as well as to the phase adjust circuit 206 for purposes of adjusting the phase of the equalized partial response signal 222 and generating the phase adjusted partial response signal 226.

Figure 5:
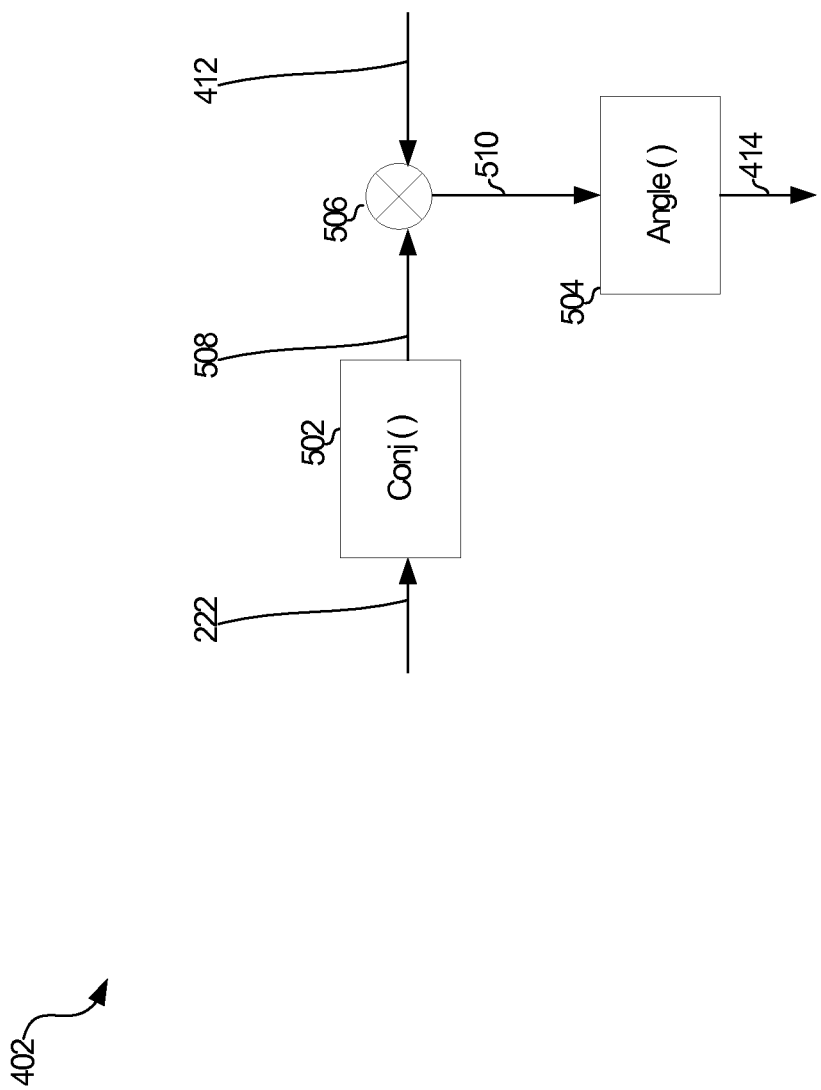
FIG. 5 is a block diagram illustrating an example phase detector circuit, which may be used during carrier recovery in a system configured for low-complexity, highly-spectrally-efficient communications.

FIG. 5 is a block diagram illustrating an example phase detector circuit, which may be used during carrier recovery in a system configured for low-complexity, highly-spectrally-efficient communications. Referring to FIG. 5, the phase detector circuit 402 may comprise a conjugate function module 502, an angle function module 504, and a multiplier 506.

The conjugate function module 502 may comprise suitable circuitry, logic and/or code and may be operable to output the complex conjugate of the equalized partial response signal 222 as conjugate output signal 508. The conjugate output signal 508 may be multiplied with the rotated version (412) of the partial response feedback signal 207, to generate the multiplied signal 510.

The angle function module 504 may comprise suitable circuitry, logic and/or code and may be operable to output the phase angle of the multiplied signal 510 as the phase error signal (e.g., 414).

Figure 6:
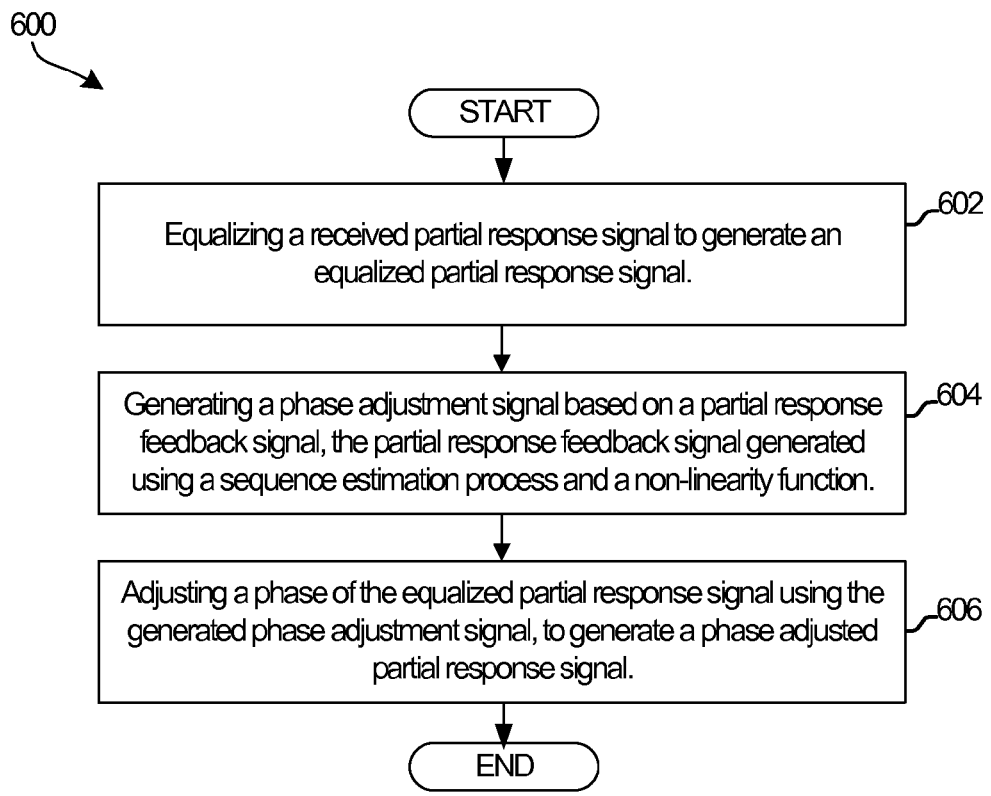
FIG. 6 is a flow diagram of an example method for signal processing in a receiver for use in a system configured for low-complexity, highly-spectrally-efficient communications.

FIG. 6 is a flow diagram of an example method for signal processing in a receiver for use in a system configured for low-complexity, highly-spectrally-efficient communications. Referring to FIGS. 4-6, the example method 600 may start at 602, when the equalizer 202 may equalize a received partial response signal (e.g., 122) to generate an equalized partial response signal (e.g., 222). At 604, the carrier recovery block 208 may generate a phase adjustment signal (e.g., 228) based on a partial response feedback signal (e.g., 207). The partial response feedback signal may be generated using a sequence estimation process (performed by, e.g., the sequence estimation block 210) and a non-linearity function (performed by, e.g., the non-linearity modeling circuit 236b). At 606, the phase adjust circuit 206 may adjust a phase of the equalized partial response signal (e.g., 222) using the generated phase adjustment signal, to generate a phase adjusted partial response signal (e.g., 226).

The phase adjustment signal (e.g., 228) may be generated (e.g., by the carrier recovery circuit 208) based on a phase difference between the equalized partial response signal (e.g., 222) and the partial response feedback signal (e.g., 207).

At least one partial response vector (e.g., 232) may be generated by buffering (e.g., buffer 212) samples of the phase adjusted partial response signal (e.g., 226). Over multiple iterations of the sequence estimation process in the sequence estimation circuit 210, a sequence of estimated symbols (e.g., a sequence of estimated symbols output via signal 315b) may be generated based on the at least one partial response vector (e.g., 232). The sequence of estimated symbols may be convolved (e.g., by convolution circuit 316b) with at least one tap coefficient to generate a convolved partial response signal (e.g., 209). The at least one tap coefficient may include at least one tap coefficient of a partial response filter.

The partial response feedback signal (e.g., 207) may be generated by applying the non-linearity function (e.g., 236b) to the convolved partial response signal (e.g., 209). The generating of the phase adjustment signal (e.g., 228) may include generating a phase error signal (e.g., 414) corresponding to a phase difference between a rotated version (e.g., 412) of the partial response feedback signal and the equalized partial response signal (e.g., 222). The partial response feedback signal (e.g., 207) may be rotated (e.g., by multiplier 410) based on the phase error signal (e.g., 414), to generate the rotated version (e.g., 412) of the partial response feedback signal. The loop filter 404 may filter the phase error signal (e.g., 414) to generate the phase adjustment signal (e.g., 416 and then 228). One or more parameters (e.g., Q, q1, q2, and/or q3, as explained herein above) that control bandwidth of a feedback loop of the filter 404 may be dynamically adjusted. In addition, a gain of the feedback loop of the filter 404 may also be dynamically adjusted.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform one or more of the processes/methods described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising: in a receiver: equalizing a received inter-symbol correlated (ISC) signal to generate an equalized ISC signal;

generating a phase adjustment signal based on an ISC feedback signal, said ISC feedback signal generated using a sequence estimation process and a non-linearity function;

adjusting a phase of said equalized ISC signal using said generated phase adjustment signal, to generate a phase adjusted ISC signal; and generating at least one ISC vector by buffering samples of said phase adjusted ISC signal, wherein said sequence estimation process comprises:

generating a sequence of estimated symbols based on said at least one ISC vector; convolving said sequence of estimated symbols with at least one tap coefficient to generate a convolved ISC signal; and generating said ISC feedback signal by applying said non-linearity function to said convolved ISC signal.

2. The method according to claim 1, comprising:
generating said phase adjustment signal based on a phase difference between said equalized ISC signal and said ISC feedback signal.

3. The method according to claim 1, wherein said at least one tap coefficient comprises at least one tap coefficient of a filter.

4. The method according to claim 1, wherein said generating of said phase adjustment signal comprises:
generating a phase error signal corresponding to a phase difference between a rotated version of said ISC feedback signal and said equalized ISC signal.

5. The method according to claim 4, comprising:
rotating said ISC feedback signal based on said phase error signal, to generate said rotated version of said ISC feedback signal.

6. The method according to claim 4, comprising:
filtering using at least one feedback loop, said phase error signal to generate said phase adjustment signal.

7. The method according to claim 6, comprising:
dynamically adjusting parameters that control bandwidth and/or gain of said at least one feedback loop.

8. The method according to claim 1, wherein the received ISC signal is a partial response signal generated via a partial response filter.

9. A system, comprising:
circuitry that includes an equalization circuit, a phase adjustment circuit, a sequence estimation circuit, a non-linearity modeling circuit, and a carrier recovery circuit, wherein:
said circuitry is operable to equalize a received inter-symbol correlated (ISC) signal to generate an equalized ISC signal;
said circuitry is operable to generate a phase adjustment signal based on an ISC feedback signal, said ISC feedback signal generated using a sequence estimation process and a non-linearity function;
said circuitry is operable to adjust a phase of said equalized ISC signal using said generated phase adjustment signal, to generate a phase adjusted ISC signal; and
said circuitry is operable to generate at least one ISC vector by buffering samples of said phase adjusted ISC signal, wherein during said sequence estimation process, said circuitry is operable to:
generate a sequence of estimated symbols based on said at least one ISC vector; and
convolve said sequence of estimated symbols with at least one tap coefficient to generate a convolved ISC signal.

10. The system according to claim 9, wherein said circuitry is operable to generate said phase adjustment signal based on a phase difference between said equalized ISC signal and said ISC feedback signal.

11. The system according to claim 9, wherein said at least one tap coefficient comprises at least one tap coefficient of a filter.

12. The system according to claim 9, wherein said circuitry is operable to generate said ISC feedback signal by applying said non-linearity function to said convolved ISC signal.

13. The system according to claim 9, wherein during said generating of said phase adjustment signal, said circuitry is operable to generate a phase error signal corresponding to a phase difference between a rotated version of said ISC feedback signal and said equalized ISC signal.

14. The system according to claim 13, wherein said circuitry is operable to rotate said ISC feedback signal based on said phase error signal, to generate said rotated version of said ISC feedback signal.

15. The system according to claim 13, wherein the received ISC signal is a partial response signal generated via a partial response filter.

16. A receiver, comprising:
a sequence estimation circuit that operates to generate a convolved inter-symbol correlated (ISC) signal based on a sequence estimation process that comprises:
generation of a sequence of estimated symbols based on at least one ISC vector generated by buffering samples of a phase adjusted ISC signal; and
convolution of said sequence of estimated symbols with at least one tap coefficient to generate said convolved ISC signal;
a non-linearity modeling circuit that operates to generate an ISC feedback signal by applying a non-linearity function to said convolved ISC signal; and
a carrier recovery circuit that operates based on said ISC feedback signal.

17. The receiver of claim 16, comprising:
an equalizer; and
a phase adjustment circuit, wherein:
an output of said equalizer circuit is input to said carrier recovery circuit and to said phase adjustment circuit;
an output of said carrier recovery circuit is input to said phase adjustment circuit; and
an output of said phase adjustment circuit is a phase adjusted version of said output of said equalizer circuit.

* * * * *